United States Patent
Le-Faucheur et al.

(10) Patent No.: US 7,822,011 B2
(45) Date of Patent: Oct. 26, 2010

(54) SELF-SYNCHRONIZED STREAMING ARCHITECTURE

(75) Inventors: Laurent Le-Faucheur, Antibes (FR); Gilles Dassot, Biot (FR); Sebastien Guiriec, Cagnes sur Mer (FR); Cyril Germond, Mougins (FR)

(73) Assignee: Texas Instruments Incorporated, Dallas, TX (US)

( * ) Notice: Subject to any disclaimer, the term of this patent is extended or adjusted under 35 U.S.C. 154(b) by 627 days.

(21) Appl. No.: 11/693,935

(22) Filed: Mar. 30, 2007

(65) Prior Publication Data

US 2008/0240074 A1 Oct. 2, 2008

(51) Int. Cl.
*H04J 3/06* (2006.01)
*H04L 7/00* (2006.01)
*H04L 25/00* (2006.01)

(52) U.S. Cl. ............... 370/350; 370/509; 375/354; 375/372

(58) Field of Classification Search ............... 370/350, 370/230, 230.1, 231, 232, 233, 234, 235, 370/235.1, 509; 375/354, 372
See application file for complete search history.

(56) References Cited

U.S. PATENT DOCUMENTS

| | | | |
|---|---|---|---|
| 6,310,652 B1 | 10/2001 | Li et al. | |
| 2002/0075857 A1* | 6/2002 | LeBlanc | 370/352 |
| 2004/0143675 A1 | 7/2004 | Aust | |

* cited by examiner

*Primary Examiner*—Lewis G West
*Assistant Examiner*—Opiribo Georgewill
(74) *Attorney, Agent, or Firm*—Wade J. Brady, III; Frederick J. Telecky, Jr.

(57) ABSTRACT

Synchronization of downlink streaming data is performed by estimating the likelihood of an underflow or an overflow in an output buffer upon receipt of each encoded data frame to determine if synchronization will be needed. After each encoded data frame is decoded it is then synchronized if the estimate indicated synchronization would be needed. Synchronization of uplink steaming data is performed by estimating the likelihood of an underflow or an overflow in an input buffer upon sending of each encoded data frame to an output modem for transmission to determine if synchronization will be needed. If needed, synchronization will be performed later on a portion of data samples taken from the input buffer that are used to form a frame of un-encoded data samples.

15 Claims, 7 Drawing Sheets

SELF-SYNCHRONIZED STREAMING ARCHITECTURE

FIELD OF THE INVENTION

This invention generally relates to data streaming systems such as mobile telephony and video conferencing.

BACKGROUND OF THE INVENTION

The Global System for Mobile Communications (GSM: originally from Groupe Spécial Mobile) is currently the most popular standard for mobile phones in the world and is referred to as a 2G (second generation) system. W-CDMA (Wideband Code Division Multiple Access) is a type of 3G (third generation) cellular network. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

The ability to perform handovers without interruption of service is a key requirement for all cellular networks. Historically, this has focused on supporting a voice call during handover for a given cellular technology. This situation has now changed with the need to support cell transitions for multiple services (voice, video and data) and also to seamlessly encompass a variety of wireless technologies (GSM/EDGE, WCDMA/HSDPA). There are two reasons why a handoff (handover) might be conducted: if the phone has moved out of range from one cell site (base station) and can get a better radio link from a stronger transmitter, or if one base station is full the connection can be transferred to another nearby base station.

The most basic form of handoff is that used in GSM and analog cellular networks, where a phone call in progress is redirected from one cell site and its transmit/receive frequency pair to another base station (or sector within the same cell) using a different frequency pair without interrupting the call. In GSM, the access technology is TDMA based and hence, the mobile's receiver can use "free timeslots" to change frequency and make measurements. Using the information from the measurement reports, the network can then choose to instruct the mobile to perform a handover from its existing serving cell to a given target cell as defined. As the phone can be connected to only one base station at a time and therefore needs to drop the radio link for a brief period of time before being connected to a different, stronger transmitter, this is referred to as a hard handoff. This type of handoff is described as "break before make" (referring to the radio link).

In CDMA systems the phone can be connected to several cell sites simultaneously, combining the signaling from nearby transmitters into one signal using a rake receiver. Each cell is made up of one to three (or more) sectors of coverage, produced by a cell site's independent transmitters outputting through antennas pointed in different directions. The set of sectors the phone is currently linked to is referred to as the "active set". A soft handoff occurs when a CDMA phone adds a new sufficiently-strong sector to its active set. It is so called because the radio link with the previous sector(s) is not broken before a link is established with a new sector; this type of handoff is described as "make before break". In the case where two sectors in the active set are transmitted from the same cell site, they are said to be in softer handoff with each other.

There are also inter-radio access technology (I-RAT) handoffs where a call's connection is transferred from one access technology to another, e.g. a call being transferred from GSM to W-CDMA. If the mobile phone leaves a cell and no new cell can be found in the same system, the base station can hand over an appropriately equipped mobile phone to a cell in another system. These intersystem handovers are highly complex because two technically disparate systems must be combined with each other. Basically, there are two handover options from WCDMA to GSM: In the case of blind handover, the base station simply transmits the mobile phone with all relevant parameters to the new cell. The mobile phone changes "blindly" to the GSM cell, i.e. it has not yet received any information about the timing there. It will first contact the transmitted control channel (BCCH), where it tries to achieve the frequency and time synchronization within 800 ms. Next, it will switch to the handed-over physical voice channel, where it will carry out the same sequence as with the non-synchronized intercell handover. For the second type of handover from WCDMA to GSM, the compressed mode is used within the WCDMA cell; in this mode, transmission and reception gaps occur during the transmission between base station and mobile phone. During these gaps, the mobile phone can measure and analyze the nearby GSM cells. For this purpose, the base station, similar to the GSM system, provides a neighbor cell list and the mobile phone transfers the measurement results to the base station. The actual handover in the compressed mode is basically analogous to blind handover.

During handovers, muting of the audio provided to the cell phone user is generally required in order to compensate for the interruptions to the data stream.

SUMMARY OF THE INVENTION

An embodiment of the present invention provides a method for synchronizing streaming data by estimating if a buffer is likely to overflow or underflow and smoothly shrinking or stretching the data stream to prevent underflow and overflow.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Mobile telephony is based on transmission of encoded frames that may arrive and depart at irregular times due to factors such as: time allocation of the transmission protocol, varying transmission distance from a base station, intra and inter RAT (radio access technology) handoff activity, signal reflections by buildings and other obstructions, clock drifts between various pieces of equipment in the system, jitter in processing each frame of encoded data, round trip transmission delays, etc. The telephone handset, often referred to as a cell phone, attempts to input and output audio data streams sample by sample at a fixed sample rate in order to minimize sound quality distortion. A synchronization system is provided that overcomes these factors and provides audio data streaming continuity at both ends of the system.

Figure 1:
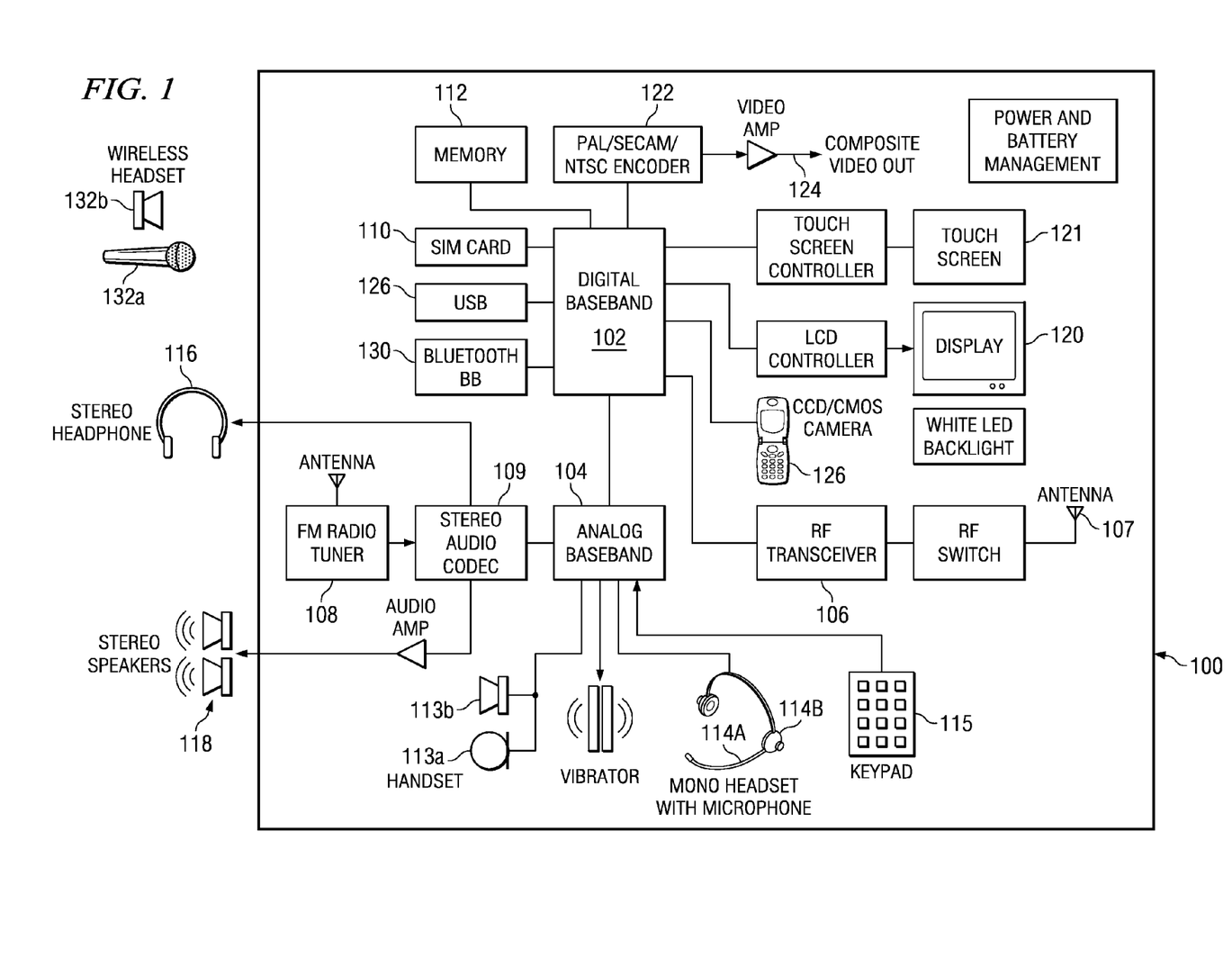
FIG. 1 is a block diagram of a representative cell phone that performs synchronization of a stream of audio data frames.

FIG. 1 is a block diagram of a representative cell phone 100 that includes an embodiment of the present invention for synchronization of a stream of audio data frames. Digital baseband (DBB) unit 102 is a digital processing processor system that includes embedded memory and security features. In this embodiment, DBB 102 is an open media access platform (OMAP™) available from Texas Instruments designed for multimedia applications. Some of the processors in the OMAP family contain a dual-core architecture consisting of both a general-purpose host ARM™ (advanced RISC (reduced instruction set processor) machine) processor and one or more DSP (digital signal processor). The digital signal processor featured is commonly one or another variant of the Texas Instruments TMS320 series of DSPs. The ARM architecture is a 32-bit RISC processor architecture that is widely used in a number of embedded designs.

Analog baseband (ABB) unit 104 performs processing on audio data received from stereo audio codec (coder/decoder) 109. Audio codec 109 receives an audio stream from FM Radio tuner 108 and sends an audio stream to stereo headset 116 and/or stereo speakers 118. In other embodiments, there may be other sources of an audio stream, such a compact disc (CD) player, a solid state memory module, etc. ABB 104 receives a voice data stream from handset microphone 113a and sends a voice data stream to handset mono speaker 113b. ABB 104 also receives a voice data stream from microphone 114a and sends a voice data stream to mono headset 114b. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same OMAP processor that performs DBB processing. In another embodiment, a separate DSP or other type of processor performs ABB processing.

RF transceiver 106 includes a receiver for receiving a stream of coded data frames from a cellular base station via antenna 107 and a transmitter for transmitting a stream of coded data frames to the cellular base station via antenna 107. In this embodiment, multiple transceivers are provided in order to support both GSM and WCDMA operation. Other embodiments may have only one type or the other, or may have transceivers for a later developed transmission standard. In other embodiments, a single transceiver may be configured to support multiple Radio Access Technologies. RF transceiver 106 is connected to DBB 102 which provides processing of the frames of encoded data being received and transmitted by cell phone 100.

DBB unit 102 may send or receive data to various devices connected to USB (universal serial bus) port 126. DBB 102 is connected to SIM (subscriber identity module) card 110 and stores and retrieves information used for making calls via the cellular system. DBB 102 is also connected to memory 112 that augments the onboard memory and is used for various processing needs. DBB 102 is connected to Bluetooth baseband unit 130 for wireless connection to a microphone 132a and headset 132b for sending and receiving voice data.

DBB 102 is also connected to display 120 and sends information to it for interaction with a user of cell phone 100 during a call process. Display 120 may also display pictures received from the cellular network, from a local camera 126, or from other sources such as USB 126.

DBB 102 may also send a video stream to display 120 that is received from various sources such as the cellular network via RF transceiver 106 or camera 126. DBB 102 may also send a video stream to an external video display unit via encoder 122 over composite output terminal 124. Encoder 122 provides encoding according to PAL/SECAM/NTSC video standards.

Figure 2:
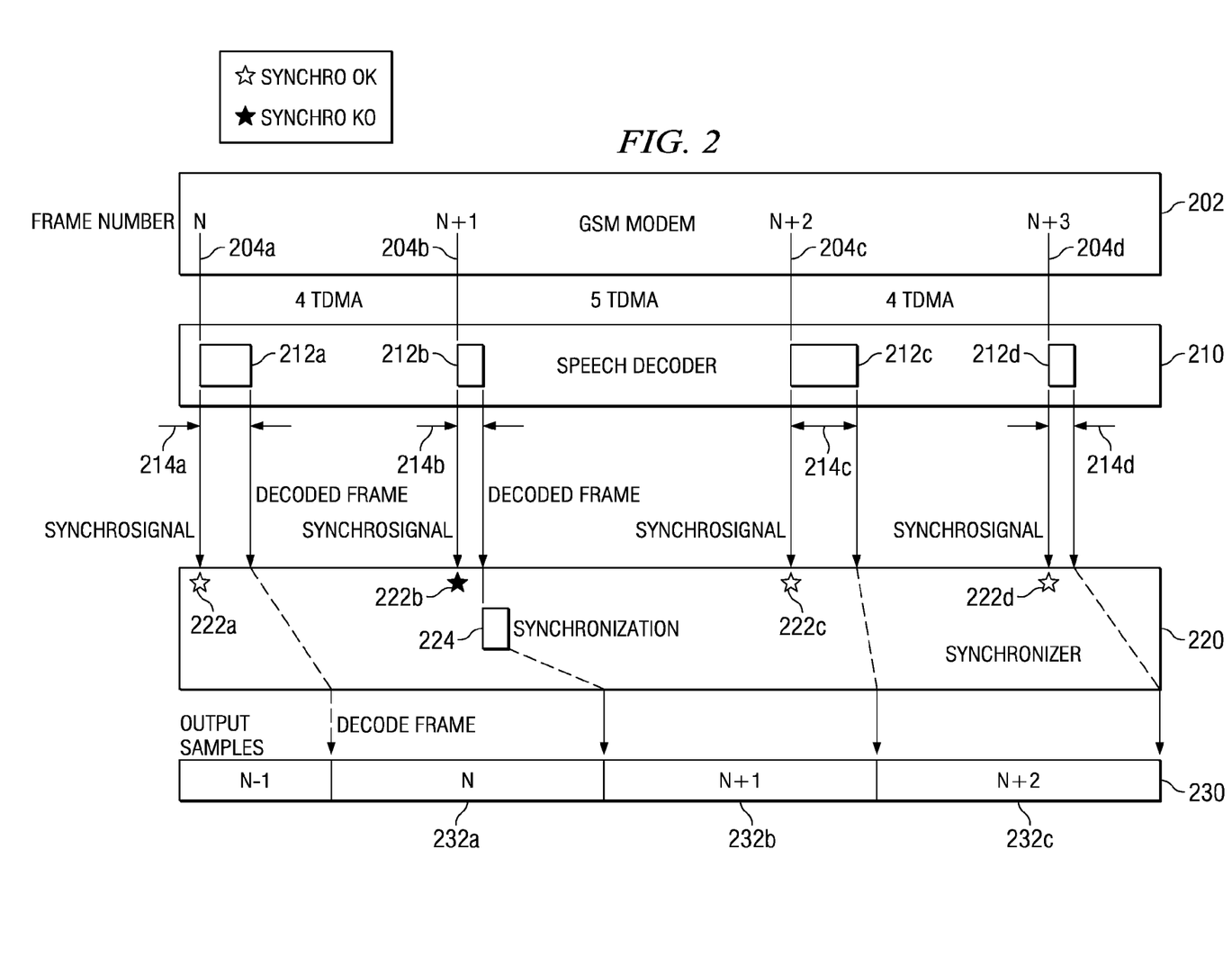
FIG. 2 is a time line illustrating operation of the data stream synchronization process on the cell phone of FIG. 1.

FIG. 2 is a time line illustrating operation of the data stream synchronization process on the cell phone 100 of FIG. 1. Band 202 represents a stream of encoded data frames being received at DBB unit 102 from RF transceiver 106 of cell phone 100. A GSM modem is implemented by software running on DBB 102. Modem software controls transceiver 106. In the GSM transmission protocol, a cyclic sequence of 13 TDMA frames (12+1 idle) is transferred. The TDMA frame is a basic time unit in GSM and is 4.615 ms long. A 13 TDMA sequence is chunked in 4, 4 and 5 TDMA frames. The result is repeating pattern of 4-4-5-4-4-5-4-4-5-... frame sequences (approximately 18.5, 18.5 and 23 ms). Thus in GSM, the encoded speech frames are delivered on downlink each 18.5, 18.5, 23 ms, even if the encoded speech frame contains 20 ms of speech. But as digital baseband unit 102 is switched on independently from the GSM modem, it may start with a 4-4-5, a 4-5-4 or a 5-4-4 sequence. The sequence illustrated in FIG. 2 is a 4-5-4 sequence. In WCDMA, the rhythm is regular (20 ms for each frame), but synchronization is still required as the WCDMA modem clock is not synchronized with the clock of ABB 104. Frame synch signal 204 indicates when each coded data frame is received from the GSM modem; this signal is then used by synchronization software running in DBB 102 as will be described later. Because of the irregular 4-5-4 TDMA chunking, frame synch signal 204 occurs at an irregular rate, as indicated at 204a-d. While four occurrences of frame synch signal 204 are illustrated, it is to be understood the stream extends both before and after the representative frames illustrated herein.

Band 210 represents processing operation of a speech decoder module in cell phone 100. In this embodiment, the speech decoder module is a software module that is executed in a processor core of DBB 102. In other embodiments, the decoder may be a hardware module or be software executed on a different processor core, for example. Frame processing operation 212 is performed on each encoded data frame after receipt of each frame is indicated by frame synch signal 204. Frame processing time 214 varies from frame to frame depending on factors such as complexity of each frame, acoustic signal processing, other tasks being performed by the processing core, etc. For example, frame processing time 214c is longer than frame processing times 214a-b or 214d. The decoder module decodes each encoded TDMA frame to produce a set of 160 PCM (pulse code modulated) audio data samples that represent 20 ms of speech or audio data. Other embodiments or protocols may use other defined sample rates or frame sizes, such as 80, 240, 320 etc samples/frame. 160 samples is a usual case, but frame size is 320 for AMR-WB speech which is 16 kHz PCM coded (better quality with higher sampling frequency) Indeed, the number of samples contained in a speech frame depends on the combination of voice codec sampling frequency, usually 8000 or 16000 Hz, and frame duration which is usually 20 milliseconds, but can be 10, 30 or other values, with n=sampling frequency*frame duration.

Band 220 represents processing operation of a synchronization module in cell phone 100. In this embodiment, the synchronization module is a software module that is executed in the DSP processor core of DBB 102. In other embodiments, the synchronizer may be a hardware module or be software executed on a different processor core, for example. An output buffer is provided in DBB102 that holds the PCM data samples of each decoded frame from which samples are provided one by one at a fixed sample rate to ABB 104 and to BBB 130. ABB 104 then routes them to audio codec 109 or handset 113b or headset 114b or other audio output path at a fixed rate as indicated by timeline 230 for conversion to an analog signal that is provided to stereo headphone 116, stereo speakers 118 or mono headset 113b or 114b. BBB 130 also transmits them at a fixed rate as indicated by timeline 230 for conversion to an analog signal that is by wireless headset 132b. In this embodiment, the fixed rate is generally 8000 samples/second, or one sample every 125 microsecond; however, other sample rates may be used depending on the protocol, as discussed above. At the time each encoded frame is received, as indicated by frame sync signal 204, a determination is made of the number of remaining data samples in the output buffer. Using this number, an estimate is calculated that can predict if an underflow or overflow of the output buffer is likely to occur before the next set of decoded PCM data samples is placed in the output buffer. If an underflow or overflow is likely to occur, then a synchronization operation 224 is performed on the frame being decoded in order to smoothly shrink or extend that frame in order to prevent a potential underflow or overflow of the output buffer.

For example, in the sequence illustrated in FIG. 2, at time 222a which corresponds to frame synch signal 204a indicating the arrival of frame n, based on the number of samples remaining in the output buffer it can be estimated that an underflow or overflow of the output buffer is unlikely during the next frame time. However, at time 222b which corresponds to frame synch signal 204b indicating the arrival of frame n+1, based on the number of samples now remaining in the output buffer, it can be estimated that on underflow is likely to occur before the next frame time. Therefore, synchronization operation 224 is performed on the decoded data samples of frame n+1. At time 222c which corresponds to frame synch signal 204c indicating the arrival of frame n+2, it can be estimated that an underflow or overflow of the output buffer is unlikely during the next frame time based on the number of samples remaining in the output buffer at that time; therefore no synchronization operation is needed. Similarly, at time 222d which corresponds to frame synch signal 204d indicating the arrival of frame n+3, it can be estimated that an underflow or overflow of the output buffer is unlikely during the next frame time based on the number of samples remaining in the output buffer at that time; therefore no synchronization operation is needed.

Figure 3:
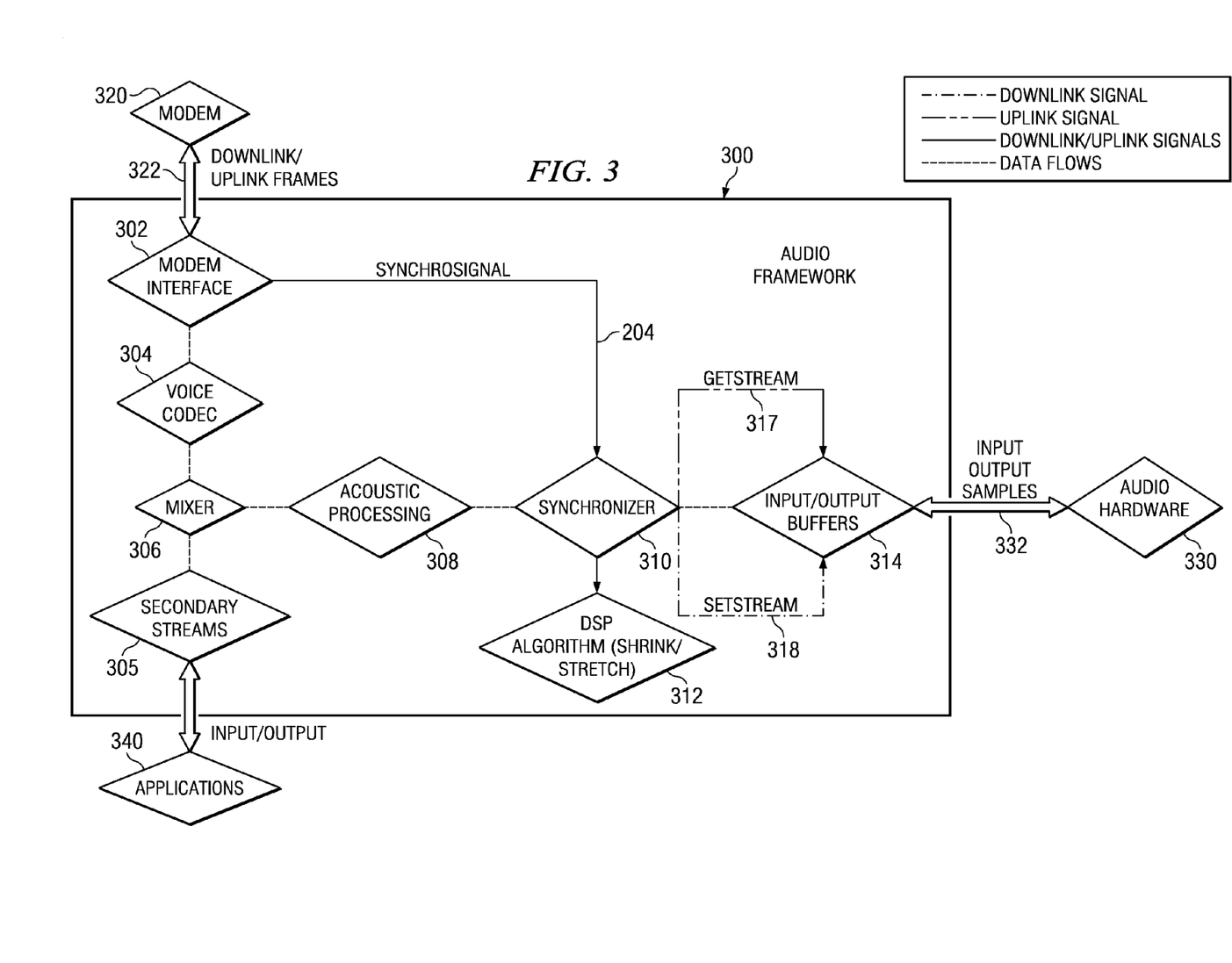
FIG. 3 is a block diagram illustrating functional blocks of a software based architecture that performs the data stream synchronization process of FIG. 2.

FIG. 3 is a block diagram illustrating functional blocks of a software based architecture 300 that performs the data stream synchronization process of FIG. 2. As mentioned earlier, the various software modules that make up software system 300 are executed on the processor cores within DBB 102. In this embodiment, there are two processor cores; in another embodiment there may be only one processor or three or more processor cores as required to handle to total system processing load. Modem 320 is embodied by modem software running on DBB 102 and receives encoded data frames on during downlink transfers and provides encoded data frames for transmission during uplink transfers. The downlink encoded frames are transferred to DBB 102 and received by modem interface 302 which generates the frame synch signal 204 upon receipt of each frame. Voice codec 304 then decodes each encoded data frame to produce a set of 160 PCM audio data samples that represent 20 ms of speech or audio data.

In this embodiment of cell phone 100, application program and hardware 340 provides secondary audio streams 305. These streams are derived from FM tuner 108, and software based applications such as voice memo, tones generation, key beeps, etc. As discussed earlier, other embodiments may have additional sources of secondary audio streams. Mixer 306 performs play and record of secondary streams on downlink and uplink. Mixer 306 mixes the downlink and uplink voice data frames and the secondary audio streams. Acoustic processor 308 performs tonal and amplitude processing, echo cancellation and miscellaneous acoustic improvements on both downlink and uplink. A user of the cell phone provides commands via keypad 115 and touch screen 121.

Input/Output buffers 314 are located in the internal memory of DBB 102 or in auxiliary memory 112. An input buffer 314 accepts PCM samples at a fixed rate from audio hardware 330 that are derived from microphone 114a, handset 113a or wireless microphone 132a. An output buffer 314 transmits PCM data samples at a fixed rate to audio hardware 330 for listening on handset 113b, headset 114b, stereo headset 116, speakers 118, or wireless headset 132b.

Each time frame synch signal 204 is asserted to indicate a new encoded data frame has been received, synchronization module 310 determines how many decoded data samples remain in output buffer 314 for downlink transfers. For each frame synch event, synchronization module 310 estimates the likelihood of an overflow or underflow of input/output buffer 314. If an underflow or overflow is likely, then various embodiments of synchronization module 310 performs one or more techniques on the pending decoded data frame, such as: adaptive coding scheme, sample drop or repeat, interpolative stretch or shrink, etc.

Once a frame has been processed if needed by synchronization module 310 the resulting decoded data samples are placed in output buffer 314 using a "set stream" event 318.

In this manner, synchronization is centralized in synchronization module 310 and requires no additional control. Since the audio digitizing/rendering processes are separate from modem 320, the system supports seamlessly multiple data pumps, such as 2-3G cell phone, UMA (unlicensed mobile access), VoIP (voice over internet protocol), VTC (video teleconferencing), etc.

This software based process also eliminates the need to perform a hardware mute during cellular handoffs. Therefore, the secondary audio stream can continue to play in an uninterrupted manner even during handoffs.

Dynamic parameterization can be performed by monitoring the processing time required by each module 302, 304, 306, and 308 and adjusting the overflow/underflow estimation process accordingly, as will be described in more detail below.

For uplink transfers, the process is similar, except that un-encoded PCM samples are obtained from input buffer 314 using a "get stream" event, encoded by codec 304 and then sent to modem 320 via modem interface 302. Each time an encoded frame is sent to modem 320, a frame synch event 204 causes the number of already acquired samples in input buffer 314 to be determined. Using this number an estimation is made of the likelihood of an underflow or overflow in input buffer 314. If an underflow or overflow is likely, then a portion of more or fewer samples is taken from input buffer 314 to form the next frame and DSP processing is performed by synchronizer 310 to smoothly shrink or expand the taken number of samples as needed.

Figure 4:
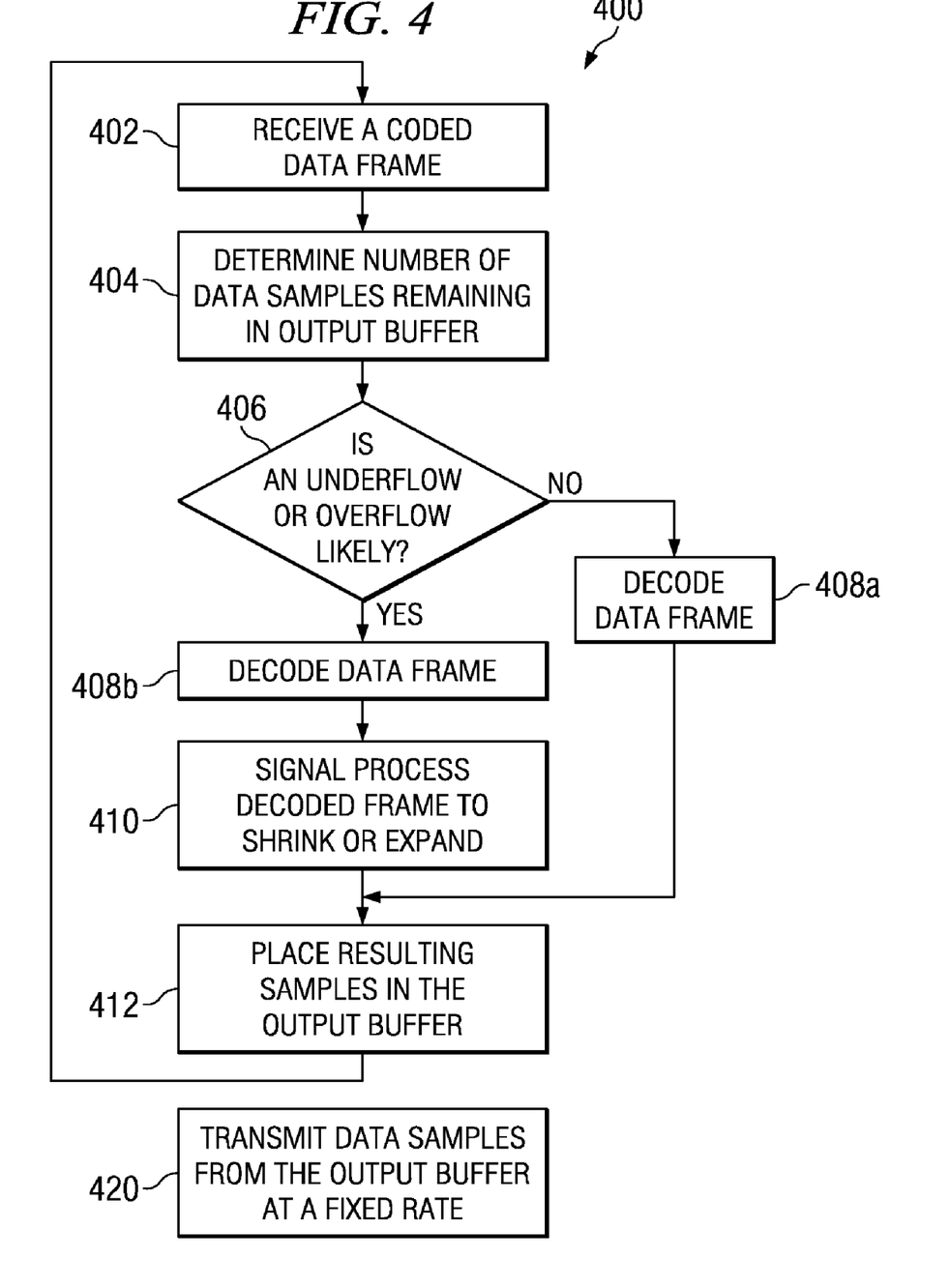
FIG. 4 is a flow diagram that illustrates operation of downlink stream synchronization in more detail.

FIG. 4 is a flow diagram that illustrates operation of downlink stream synchronization in more detail. Each time a complete encoded data frame is received 402 a determination 404 of the number of data samples remaining in output buffer 314 is made. An estimation 406 is then performed using the number of data samples remaining in the output buffer. Estimation 406 also uses various parameters including: maximum frame processing time expressed in number of samples, where each sample represents 125 microseconds in this example (as mentioned earlier other protocols may have different sample rates.); the frame length in samples which is 160 in this embodiment; the minimum number of sample times between two frame synchro events; and the maximum number of sample times between two frame synchro events. If estimation 406 indicates an overflow or underflow is unlikely, then the encoded date frame is decoded 408*a* and the resulting 160 samples are placed 412 in the output buffer. On the other hand, if estimation 406 indicates an underflow/overflow is likely, then after decoding 408*b* the encoded data frame, the decoded samples are further processed to either shrink or expand the number of PCM data samples. Essentially independently, data samples are transmitted 420 from the output buffer at a fixed rate of one sample every 125 microseconds (may be different for other protocols), converted to analog and sent to an output device such as handset speaker 113*b*, headset 114*b*, stereo headphone 116, speakers 118 or wireless headset 132*b*. Thus, synchronization is maintained with the local cell phone streaming data audio system and a remote cell phone audio system and all of the intervening communication paths.

Figure 5A:
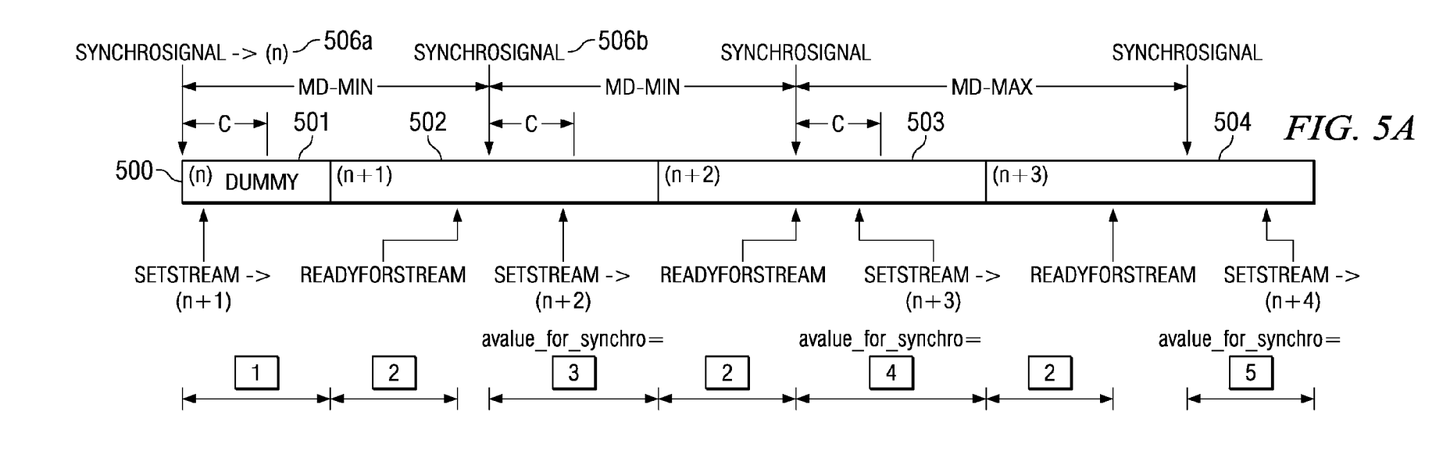
FIGS. 5A-5C are time lines illustrating nominal initial TDMA sequences of downlink decoded audio data frames that may be received by the cell phone of FIG. 1.
Figure 5B:
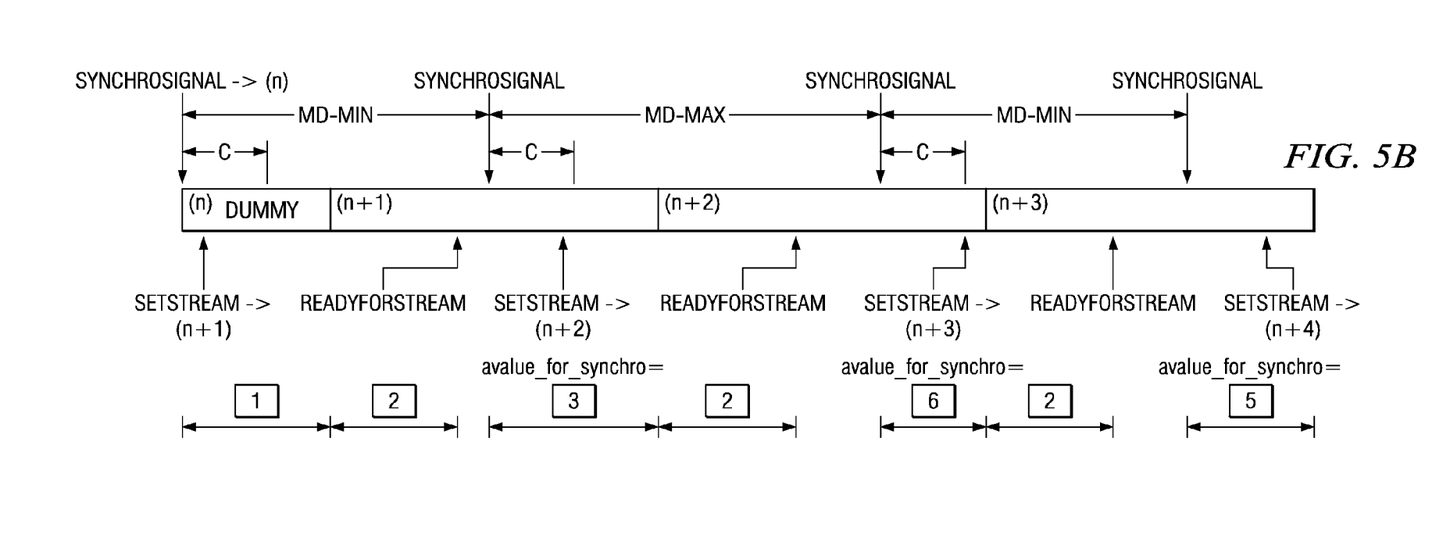
Figure 5C:
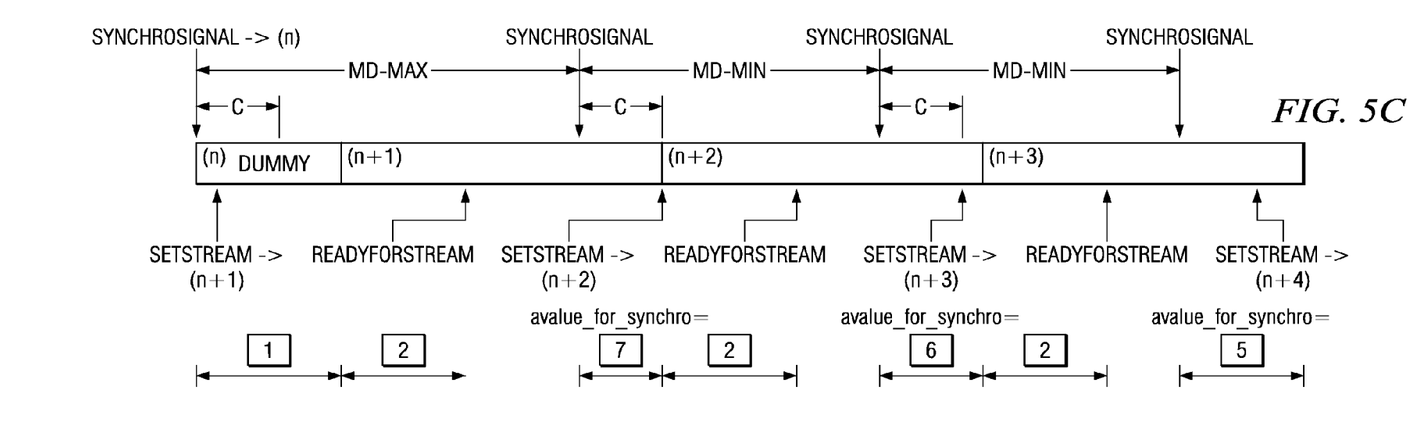

FIGS. 5A-5C are time lines illustrating nominal initial TDMA sequences of downlink decoded audio data frames that may be received by cell phone 100. When cell phone 100 initially accepts a call or after other signal interruptions such as a hard handoff between cells, a blind I-RAT handover, loss and re-acquisition of signal, etc, any one of three TDMA sequences may initially occur. The synchronization scheme accommodates all three in a manner that minimizes the mute time and allows a secondary audio stream to be played without interruption on cell phone 100. Table 1 describes the various legends and signals used in FIGS. 5A-5C and 6A-6C. Table 2 describes the various parameters illustrated in FIGS. 5A-5C.

TABLE 1 legend for FIGS. 5A-5C and FIGS. 6A-6C

| | |
|---|---|
| C | Frame processing time expressed in number of samples, where each audio sample is 125 microseconds (for example). |
| Cdl | The maximum frame processing time for downlink path, expressed in number of samples, where each audio sample is 125 microseconds. This is a worst case value that includes speech decoding, acoustic improvement processing, jitter and an optional margin value. |
| Cul | The maximum frame processing time for uplink path, expressed in number of samples, where each audio sample is 125 microseconds. This is a worst case value that includes speech decoding, acoustic improvement processing, jitter and an optional margin value. |
| Stream_size | The frame length in samples |
| Min_modem_delivery | Modem delivery, minimum number of samples between two consecutive synchrosignal events; MD-min (in GSM: number of 125 microseconds samples in 4 TDMA) |
| Max_modem_delivery | Modem delivery, maximum number of samples between two consecutive synchrosignal events; MD-max (in GSM: number of 125 microseconds samples in 5 TDMA) |
| A_value_dl | Number of samples remaining in the output buffer from frame n − 1 when frame n is delivered by the modem |
| A_value_ul | Number of samples already acquired in the input buffer from frame n + 1 when frame n is taken by the modem |

TABLE 2 parameters for FIGS. 5A-5C

| | |
|---|---|
| N | = 2 × max_modem_delivery + Cdl |
| [1] | = max_modem_delivery + C − stream size |
| | = N − stream_size |
| [2] | = 2 stream_size − internal_buffer_size |
| [3] | = (max_modem_delivery − min_modem_delivery) + C |
| | = N − min_modem_delivery |
| [4] | = stream_size + max_modem_delivery + C − 2 min_modem_delivery |
| | = N + stream_size − 2 min_modem_delivery |
| [5] | = 2(stream_size − min_modem_delivery) + C |
| [6] | = stream_size + C − min_modem_delivery |
| [7] | = C |

FIG. 5A represents a 4-4-5 TDMA download frame sequence (approximately 18.5, 18.5 and 23 ms). Band 500 represents decoded frame data samples in output buffer 314 of cell phone 100. When a connection or handover is initially started, dummy data 501 is placed in output buffer 314 since no decoded frame data is available. The data has a zero value so that no sound is produced in the output devices of cell phone 100. However, if a secondary stream was being played then the secondary stream data sample are mixed with the dummy data in mixer module 306, as discussed earlier. In this manner, muting is provided during the startup or handoff, but the muting is software based rather than hardware based and the secondary audio stream therefore continues to play without interruption. The amount of dummy data is selected to be at least max_modem_delivery−stream_size+Cdl so that there is no risk of output buffer underflow.

Synchrosignal 506*a* indicates a first encoded frame has been received. Using the parameters described below frame 502 is synchronized by stretching or shrinking the number of data samples, as described earlier. Alternatively, dummy samples can be added or deleted from the output buffer in order to synchronize the first frame.

Synchrosignal 506*b* indicates receipt of the next encoded data frame and a synchronization operation 224 is performed on the next frame after it is decoded, if needed. After several frames have been acquired and synchronized after startup, then the system operates in a more steady state mode. Synchronization while in steady state mode normally only adds or drops one or two samples over hundreds or thousands of frames, typically, depending on how much the modem and ABB clocks drift relatively.

FIG. 5B represents a 4-5-4 TDMA download frame sequence (approximately 18.5, 23, and 18.5 ms). Similarly, FIG. 5*c* represents a 5-4-4 TDMA download frame sequence (approximately 23, 18.5 and 18.5 ms). Inspection of these three sequences reveals the following relationships:

$$\text{min\_modem\_delivery} < \text{stream\_size} < \text{max\_modem\_delivery}$$

Thus, the following relationship can be deduced for synchronization:

$$C <= \text{avalue\_for\_synchro} <= 2\text{ max\_modem\_delivery} + Cdl + \text{stream\_size} - 2\text{ min\_modem\_delivery}.$$

An equivalent relationship is:

$C <= \text{avalue\_for\_synchro} <= N + \text{stream\_size} - 2\text{ min\_modem\_delivery}$ Therefore, at each synchronization event on a download stream an estimate can be made of the likelihood of an underflow or overflow by comparing the number of remaining samples in the output buffer to the range [Cdl, N+stream_size−2 min_modem_delivery] and as long as it is within this range, no synchronization operation is needed. If it is outside this range, then a synchronization operation is performed.

Figure 6A:
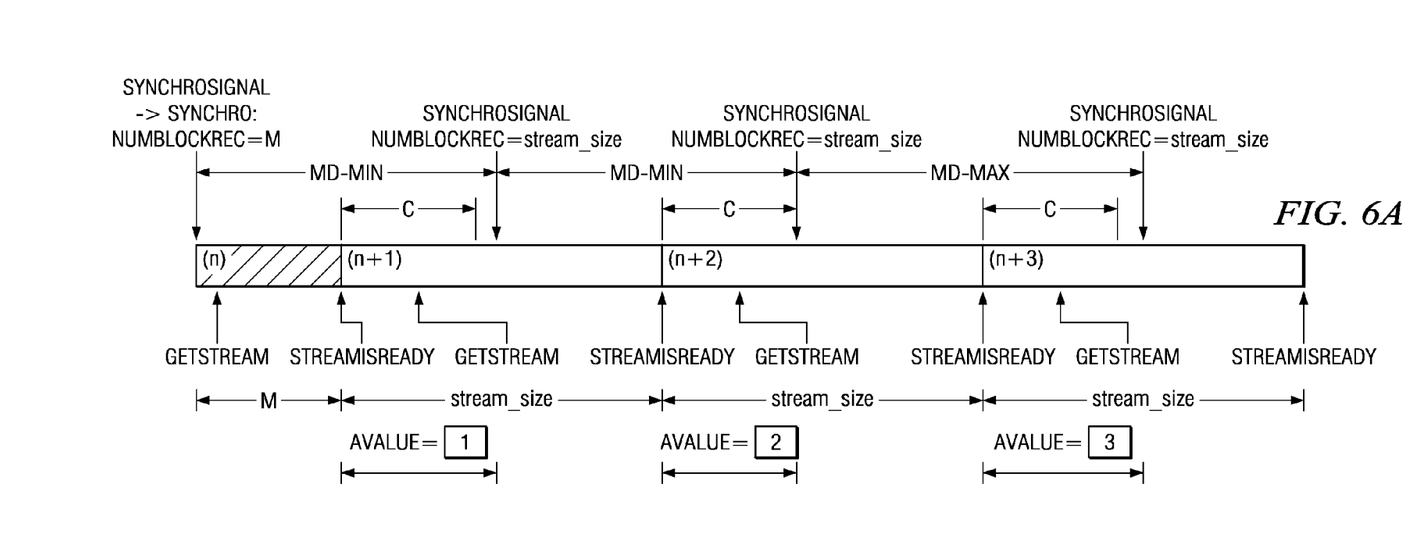
FIGS. 6A-6C are time lines illustrating nominal initial TDMA sequences of uplink audio data frames that may be sent by the cell phone of FIG. 1.
Figure 6B:
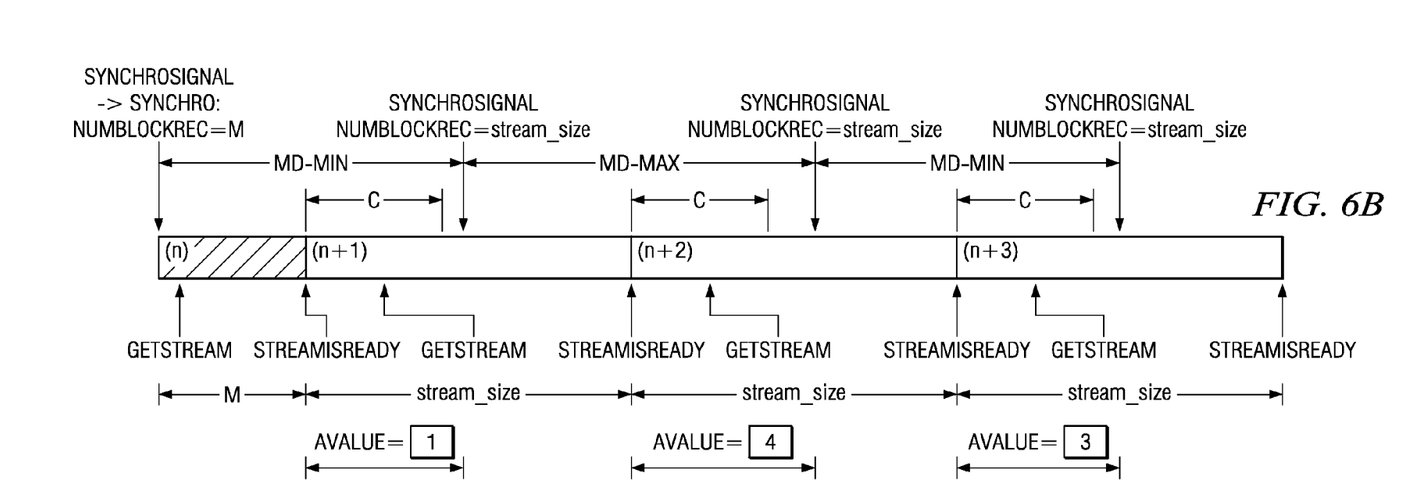
Figure 6C:
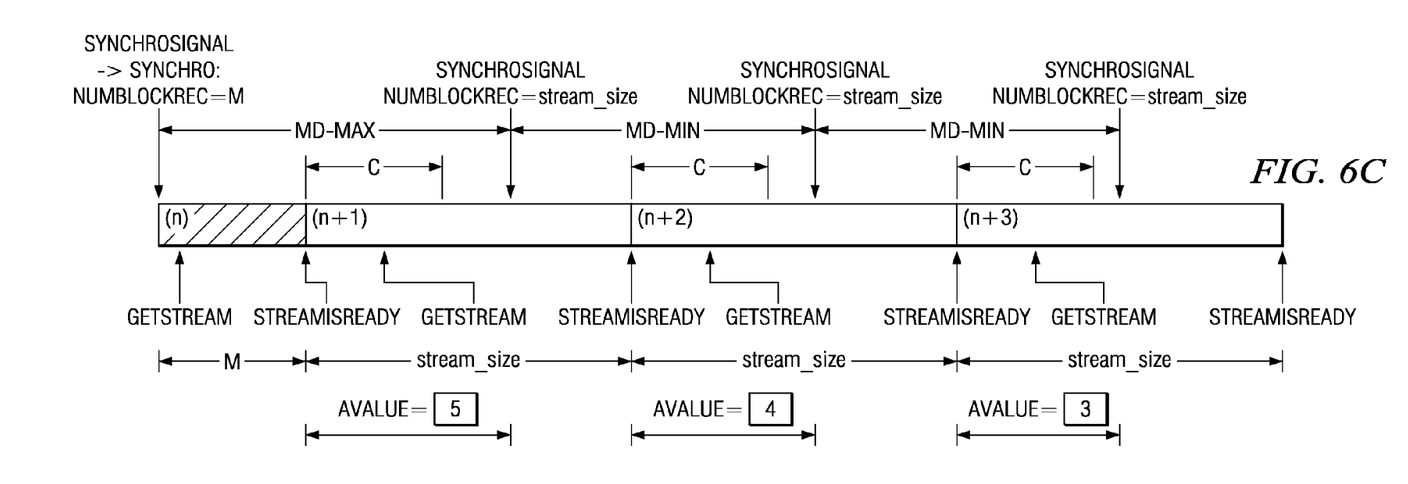

FIGS. 6A-6C are time lines illustrating nominal initial TDMA sequences of uplink audio data sample frames that may be transmitted by cell phone 100. When cell phone 100 initially accepts a call or after other signal interruptions such as a hard handoff between cells, a blind I-RAT handover, loss and re-acquisition of signal, etc, any one of three TDMA sequences may initially occur. The synchronization scheme accommodates all three in a manner that minimizes the mute time. Table 1 describes the various legends and signals used in FIGS. 6A-6C. Table 3 describes the various parameters illustrated in FIGS. 6A-6C.

TABLE 3 parameters for FIGS. 6A-6C

| | |
|---|---|
| M | = 2 × min_modem_delivery − stream_size − Cul |
| [1] | = (C + stream_size) − min_modem_delivery |
| [2] | = C |
| [3] | = max_modem_delivery + C − stream_size |
| [4] | = (max_modem_delivery − min_modem_delivery + C |
| [5] | = max_modem_delivery + stream_size + C − 2 min_modem_delivery |

Upon startup after a handoff, a number of data samples equal to M (=2×min_modem_delivery−stream_size−Cul) are taken into the input buffer from an external source at the sample interval timing, 125 microseconds in this example. Thereafter, a portion of data samples are taken periodically from the input buffer for forming each frame of un-encoded data samples at a fixed time interval equal in time to stream_size, which is defined to be 160 samples at 125 microseconds/sample, or 20 ms in this example. If synchronization is needed, then a smaller or larger number of samples are taken and then stretched or shrunk by the synchronization operation to form a frame of 160 un-encoded data samples in this example.

Inspection of these three sequences reveals the following relationships:

$$\text{min\_modem\_delivery} < \text{stream\_size} < \text{max\_modem\_delivery}$$

Thus, the following relationship can be deduced for synchronization:

$$C <= \text{avalue\_for\_synchro} <= \text{max\_modem\_delivery} + \text{stream\_size} + Cul - 2\text{min\_modem\_delivery}.$$

An equivalent relationship is:

$C <= \text{avalue\_for\_synchro} <= \text{max\_modem\_delivery} - M$

Therefore, at each synchronization event on an uplink stream, which is the time the modem requests the next encoded frame of data for transmission to the base station, an estimate can be made of the likelihood of an underflow or overflow by comparing the number of already acquired samples in the input buffer at the time of the synchronization event to the range [Cul, max_modem_delivery−M] and as long as the number is within this range, no synchronization operation is needed. If it is outside this range, then a synchronization operation is performed. While the decision to perform a synchronization operation is taken at the time an encoded frame is sent to the modem for transmission, the synchronization operation itself will be performed later when (a_value_ul+M) samples will have been acquired. From this (a_value+M) samples buffer, 160 samples will be produced by shrinking or stretching.

The synchronization operation described above can be applied to other frame streaming systems. For example, in a video system such as that provided on cell phone 100 for display of video clips on display 100 or for display of composite video connected to output 124, video frame synchronization can be performed by determining a range a values for the number of samples in the video output buffer this are unlikely to result in underflow or overflow. Once this range is determined, then the number of samples in the output buffer can be determined upon the receipt of each new encoded video frame and an estimate can be made of the likelihood of overrun or underflow based on this number. Synchronization is then performed accordingly only as needed.

Thus, many different types of devices that employ streaming encoded data frames may benefit from the use of the synchronization process described herein.

What is claimed is:

1. A method for maintaining synchronization of streaming data, comprising the steps of:
   receiving a stream of encoded data frames;
   determining a number of remaining data samples in an output buffer upon receipt of each encoded data frame;
   decoding each encoded data frame to form a stream of decoded frames; each decoded frame has a defined number of decoded data samples;
   performing a synchronization operation on each frame of decoded data samples if the number of remaining data samples is outside the range of Cdl to (2 max modem delivery+Cdl+stream size−2 min modem delivery), where Cdl is a worst case frame processing time, expressed in number of samples, max modem delivery is the maximum number of samples between two consecutive synchrosignal events, stream size is the frame length in samples, and min modem delivery is the minimum number of samples between two consecutive synchrosignal events;

placing the resulting decoded frame data samples in the output buffer; and transmitting the data samples from the output buffer to an output device at a fixed rate.

2. The method of claim 1, wherein determining a number of remaining samples is performed prior to decoding each frame.

3. The method of claim 1, wherein receiving a stream of encoded data frames occurs in a time variant manner.

4. The method of claim 1, wherein a synchronization signal is asserted to indicate the reception of the coded data frame.

5. The method of claim 1, wherein the worst case frame processing time is monitored and adjusted dynamically.

6. A method for maintaining synchronization of streaming data, comprising the steps of:
   receiving in a stream of coded data frames that includes a synchronization signal for each coded data frame;
   determining a number of remaining data samples in an output buffer in response to the synchronization signal for a first coded data frame from the stream of coded data frames;
   decoding the coded data frames to form a stream of decoded frames; each decoded frame having a defined number of decoded data samples;
   performing a synchronization operation on the decoded data samples of the first coded data frame if the determined number of remaining data samples is outside a range of Cdl to (N+stream_size−2×min_modem_delivery), where Cdl is a worst case frame processing time, expressed in a number of samples, N is 2×max modem delivery+Cdl, max modem delivery is the maximum number of samples between two consecutive synchrosignal events, stream size is the frame length in samples, and min modem delivery is the minimum number of samples between two consecutive synchrosignal events;
   placing the resulting decoded data samples in the output buffer; and
   transmitting the decoded data samples from the output buffer to an output device at a fixed rate.

7. The method of claim 6 wherein reception of each coded data frame itself forms the synchronization signal.

8. A cellular telephone, comprising:
   a modem connected to receive a stream of encoded data frames from a base station, the modem operable to assert a frame synch output signal upon receipt of each encoded data frame;
   a voice codec connected to the modem for decoding the encoded data frames;
   an output buffer connected to the voice codec for receiving decoded data frames operable to transmit decoded data samples to an audio reproduction unit at a fixed rate;
   an estimator operable to determine a number of samples remaining in the output buffer at the time the frame synch signal is asserted; and
   a synchronizer connected to the voice codec operable to shrink or expand a decoded data frame if the number of remaining data samples is outside the range of Cdl to (2 max modem delivery+Cdl+stream size−2 min modem delivery), where Cdl is a worst case frame processing time, expressed in a number of samples, max modem delivery is the maximum number of samples between two consecutive synchrosignal events, stream size is the frame length in samples, and min modem delivery is the minimum number of samples between two consecutive synchrosignal events.

9. The cellular telephone of claim 8, further comprising a processor core connected to a memory, the memory containing instructions for execution by the processor core and wherein the voice codec, the estimator and the synchronizer are software modules executed by the processor.

10. The cellular telephone of claim 8, wherein the estimator determines a number of remaining samples prior to decoding each frame.

11. A method for maintaining synchronization of streaming data, comprising the steps of:
   receiving a stream of data samples into an input buffer from an external device at a fixed rate;
   sending a stream of encoded data frames;
   determining a number of already acquired data samples in the input buffer upon sending of each encoded data frame;
   encoding frames of un-encoded data samples to form the stream of encoded frames; each un-encoded frame has a defined number of data samples;
   taking periodically a portion of data samples from the input buffer at a fixed time interval to form a frame of un-encoded data samples; and
   performing a synchronization operation on the portion of data samples to form the frame of un-encoded data samples if the number of already acquired data samples is outside the range of Cul to (max modem delivery+stream size+Cul−2 min modem delivery) where Cul is a worst case frame processing time, expressed in a number of samples, max modem delivery is the maximum number of samples between two consecutive synchrosignal events, stream size is the frame length in samples, and min modem delivery is the minimum number of samples between two consecutive synchrosignal events.

12. The method of claim 11, wherein sending a stream comprises sending a stream of encoded data frames to a modem for transmission.

13. The method of claim 11, wherein the worst case frame processing time is monitored and adjusted dynamically.

14. The method of claim 11, wherein the fixed time interval is equal to the time period of the defined number of data samples.

15. The method of claim 11, wherein the size of the portion of samples taken from the input buffer is increased or decreased in response to the synchronization operation and then stretched or shrunk by the synchronization operation to form the frame of un-encoded data sample having the defined number of data samples.

* * * * *